United States Patent [19]

Whittaker

[11] 4,057,180
[45] Nov. 8, 1977

[54] DOOR MOUNTED VEHICLE GUN RACK

[76] Inventor: Robert K. Whittaker, Rte. 2, Box 220, Kimberly, Idaho 83341

[21] Appl. No.: 619,609

[22] Filed: Oct. 6, 1975

[51] Int. Cl.² ............................................. A47B 81/00
[52] U.S. Cl. .................................. 224/1 R; 24/128; 24/243 R; 211/64; 224/42.45 R; 248/316 R
[58] Field of Search ............... 224/1 R, 29 R, 42.08, 224/42.39, 42.44, 42.45 R; 248/291, 309 R, 316 R; 211/64, 8, 60 G, 60 SK, 60 T, 63; 24/2.5, 3 M, 18, 128 R, 129 D, 243 AC, 243 H, 249 R, 249 SL, 257 R

[56] References Cited

U.S. PATENT DOCUMENTS

| 552,921 | 1/1896 | Miner | 24/257 R |
|---|---|---|---|
| 1,552,535 | 9/1925 | Beerstecher | 224/42.45 R X |
| 1,995,656 | 3/1935 | Stout | 248/291 |
| 2,778,552 | 1/1957 | Thompson | 224/1 R |
| 2,907,506 | 10/1959 | Sammons | 224/42.45 R X |
| 2,919,058 | 12/1959 | Thompson | 224/1 R |
| 3,027,130 | 3/1962 | Stumpff | 248/309 R |
| 3,092,362 | 6/1963 | Walsh | 248/291 |
| 3,357,663 | 12/1967 | Ivy | 248/316 R X |
| 3,556,363 | 1/1971 | Whittaker | 224/1 R |
| 3,857,491 | 12/1974 | Townsend | 224/1 R X |

Primary Examiner—Robert J. Spar
Assistant Examiner—Winston H. Douglas
Attorney, Agent, or Firm—B. Deon Criddle

[57] ABSTRACT

A two-piece assembly rack for holding rifles, shotguns and the like on the inside of a vehicle door. A rotatable butt rest supports the stock end of the gun and a rotatable arm having an elastic fastening means at the outer end fixedly holds the gun barrel in a set position on the vehicle door.

1 Claim, 9 Drawing Figures

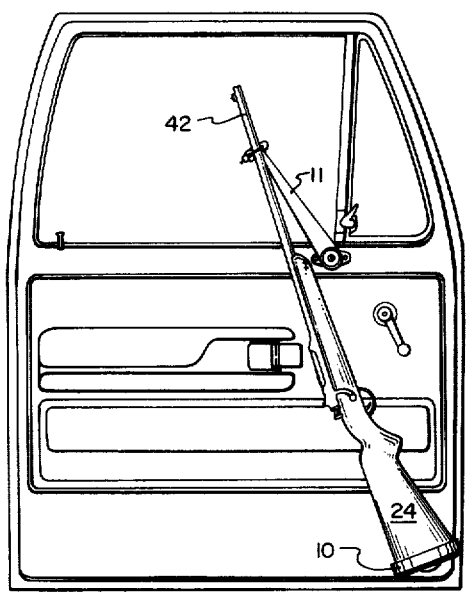
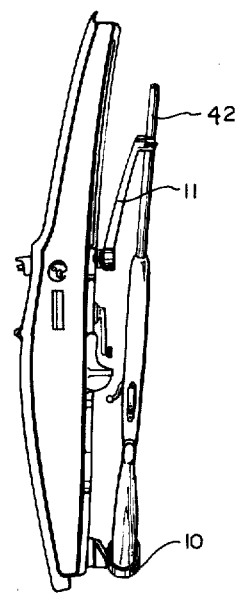
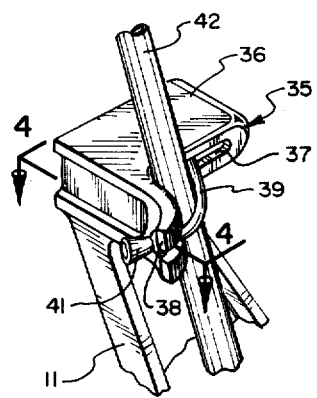
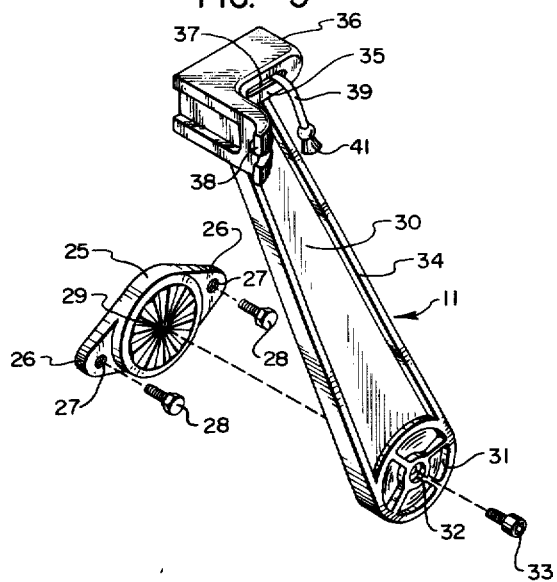
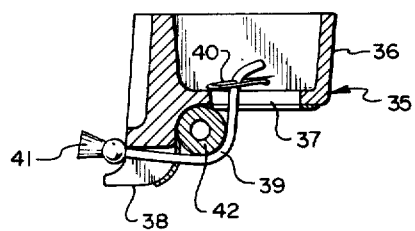
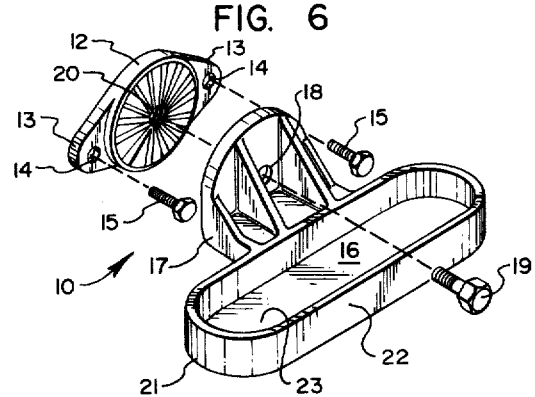

DOOR MOUNTED VEHICLE GUN RACK

BACKGROUND OF THE INVENTION

The storage of guns in a vehicle has long been a problem both from a standpoint of safety and convenience. Guns which are not fixedly connected to some portion of the vehicle present a particular safety hazard along with guns that are mounted in the so-called "window rack" that is used in pickup trucks and other cab vehicles. In placing a gun in a vehicle without support or placing a gun in a window rack, it is necessary that the muzzle be pointed into the cab or toward the person positioning the gun. When held in a window rack the gun is in a horizontal position and if advertently discharged could injure a passing motorist or be discharged into a building and the like.

Other racks have been proposed for carrying weapons in a vehicle. The most pertinent of which is Whittaker, U.S. Pat. No. 3,556,363. This patent overcame any of the prior art problems and consists of a two-piece rack for holding rifles, shotguns and the like. The rack contains a butt rest and a pivotal arm having an adjustable clamp, which clamp provides a means for holding the gun in a set position. The clamp has to be bolted into one of the holes along the length of the pivot arm depending upon the length of the gun being held. The clamp consists of a spring steel clip which, while functioning well, for its purposes has certain disadvantages. For example, a sudden jolt or other exertion of pressure on the clip can cause the gun to be released from the clip. The clip can also be "sprung" or otherwise lose its resiliency so that it cannot be used for its intended purpose. Additionally, it is well known that the circumference of a gun barrel may vary greatly according to the gun with most barrels varying in size from a 22 caliber rifle to a 12 gauge shotgun thereby making it impractical for one clip to universally accommodate all guns.

It is therefore an object of the present invention to provide a gun rack that will fit on the inside door of a vehicle, and that will universally support all shotguns, rifles and the like of any conventional length.

It is another object to provide a gun rack which will snugly hold the gun in position, but will not damage the finish of the gun.

It is another object of this invention to provide a gun rack wherein guns can be safely positioned therein, and removed therefrom, and still, at all times be conveniently available for quick use.

It is a further object of this invention to provide a gun rack wherein guns of any caliber can be conveniently held without the need to resort to repositioning of a clip in order to fixedly hold the gun.

These and other objects may be accomplished by means of an adjustable butt rest that is adapted to be secured to the lower portion of the door and is rotatable about a horizontal axis, but which can be fixed in any degree of rotation by means of interengaging fluted surfaces. The second portion of the invention includes an arm that has one end adapted to be secured to the upper portion of the lower door panel and which may be rotated about a horizontal axis and secured in any given position by means of interlocking fluted surfaces. The other end of the arm contains barrel engaging means consisting of an elastic band or cord secured to one side of the arm and which may be wound around the barrel of the gun and secured by engaging means on the other side of the arm. A shim may be needed for proper vertical alignment of either the butt rest or arm attachment plates to the door. Also, cylindrical spacers fluted on both sides may be interposed between the interlocking fluted surfaces on either the arm or butt rest to enable a gun inserted in the rack to clear door knobs, door handle or arm rest.

The novel features of this invention both as to the manner of construction or organization as well as the operation thereof will be better understood with reference to the following description and drawings. It is to be understood, however, that the description and drawings are for the purpose of illustration only and are not intended to be a definition as to the scope of this invention.

DRAWINGS OF THE INVENTION

FIG. 1 is an elevational view showing the rack of the invention supporting a rifle on the inside of a vehicle door.

FIG. 2 is an end elevational view showing a gun oppositely positioned to the gun shown in FIG. 1.

FIG. 3 is a fragmentary view of the upper end of the support arm of the invention showing the clamp means for securing the gun barrel.

FIG. 4 is a sectional view of FIG. 3 taken along lines 4—4 detailing the clamping means at the upper end of the support arm.

FIG. 5 is an exploded perspective view showing the upper arm and mounting means therefor.

FIG. 6 is an exploded perspective view of the butt plate of the rack showing the mounting means therefor.

DETAILED DESCRIPTION OF THE INVENTION

Figure 7:
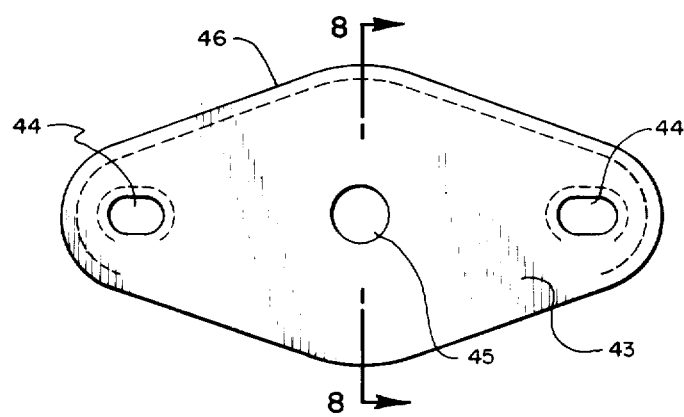
FIG. 7 is a front elevational view of a shim for vertically aligning the mounting means.

Referring now to the Drawings:

In the illustrated embodiment, the invention comprises a butt rest, shown generally at 10 and a pivotal support arm, shown generally at 11.

Butt rest 10 includes an attachment plate 12 which is generally cylindrical in shape but having tab sections 13 on either side. Said tab sections contain holes 14 through which are inserted screws 15 which are screwed into or otherwise fastened to the lower doorframe or other suitable structure of the lower portion of the lower door panel thereby securing the attachment plate to the door panel. The attachment plate 12 is fluted on the vertical cylindrical surface thereof. Butt rest 16 consists of a reenforced spacer 17, the inner surface of which is cylindrical in shape and fluted so as to interlock with the outer surface of attachment plate 12. The spacer 17 contains a hole 18 in the center thereof which is adapted to receive a bolt 19 which screws into hole 20 in the attachment plate, thereby interlocking the fluted surfaces of the attachment plate and the butt rest so that when bolt 19 is tightly screwed into hole 20 the butt rest is fixedly attached in any desired position to the attachment plate. Integral with the spacer 17 and on the outer side thereof is a trough 21 having a wall 22 and a bottom plate 23 all of which extend outwardly from the spacer 17. The floor 23 of the butt plate is rounded at the ends thereof and is encircled by the wall 22. Preferably the floor and inside wall of 22 are lined with a soft protective material such as leather, felt and the like so as not to damage the stock of the gun. The overall length of the trough is such that any conventional stock will fit therein. It will be appreciated that the stock may be rotated by loosening bolt 19 so that the interlocked fluted surfaces of attachment plate 12 and spacer 17 may be disengaged and then rotated to the desired position and bolt 19 then again tightened. When the butt plate is tilted at an angle, i.e., other than horizontal, the gunstock of gun 24 will rest against the lower wall 22 of the butt rest as illustrated in FIG. 1.

The arm assembly comprises an attachment plate 25 which is similar to attachment plate 12 in that it has a fluted cylindrical portion having attachment tabs 26 on either side and holes 27 in the tabs adapted to receive screws 28 for attachment of plate 25 into the upper portion of the lower door panel of the vehicle. A threaded hole in the center of the attachment plate is utilized for securing extension arm 30 as will be described. The lower or attachment end of extension arm 30 consists of a cylindrical portion 31 which is fluted on the inside and adapted to the interengaged or interlocked with the fluted portion of attachment plate 25. Attachment hole 32 is contained in the center of the cylindrical portion 31 and attachment bolt 33 extends through hole 32 and is screwed into hole 29. Attachment bolts 33 and 19 can contain a conventional type of head so that they can be tightened or loosened by any conventional wrench, i.e., crescent wrench, socket wrench, etc., or in the alternative, the heads may be recessed and contain a hexagonal opening so that they may be loosened or tightened with a conventional hexagonal or Allen wrench, or thumb screw type bolts. If desired, the extension arm 30 can be readily removed by removing bolt 33. The attachment plate 25 will not obstruct operation of the windows or operating the door and will not present an unsightly appearance when no gun is being carried in the vehicle.

Figure 8:
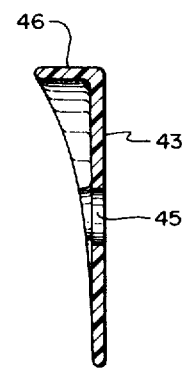
FIG. 8 is a side sectional view of the shim taken along lines 8—8 of FIG. 7.

To bring either of attachment plates 12 or 25 into vertical alignment when fastened to the door panel, it may be necessary to add an adapter on whim 43 as illustrated in FIGS. 7 and 8. Shim 43 is of the same shape as attachment plates 12 and 25 having holes 44 into which screws 15 or 28 may be inserted. Shim 43 also contains a center hole 45 into which may be inserted bolts 19 or 33. As shown in FIG. 8, shim 43 contains a spacing or flange 46 which extends backwardly from the face of the shim around a portion of the perimeter. Preferably shim 43 is made of material that can be shaped with a sharp knife, a grinding wheel or sandpaper to fit the contour of the door panel.

Figure 9:
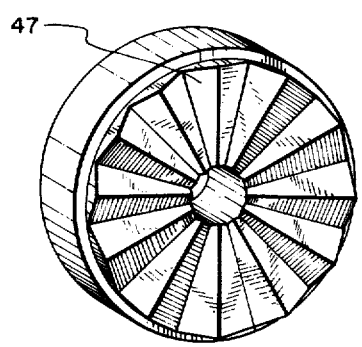
FIG. 9 is a perspective view of a cylindrical spacer fluted on both sides.

Because of the distance that the arm rests, door knobs, levers and the like may project away from the door panel, it may be necessary to add fluted spacers 47 between either or both attachment plate 12 and butt rest 16 or attachment plate 25 arm 30. As shown in FIG. 9, the spacers 47 are cylindrical in shape and are fluted on both sides. Spacers 47 contain a center hole 48 through which bolts 19 and 33 may be inserted and have a diameter and fluting which are the same as the fluted surfaces on attachment plates 12 and 25, spacer 17 and portion 31 of arm 30. Obviously spacer 47 may be different widths depending upon the extended spacing required.

When attached, extension arm 30 will angle slightly inwardly into the cab from the point of its attachment at end 31 to the barrel securing end containing attachment head 35. If desired, a reinforcing flange or rib 34 may extend along either side of extension arm 30. The barrel securing head 35 consists of a spacer 36 which is generally at right angles with the extension arm and extends inwardly into the cab sufficiently far that when the gun is held in a fixed position it will not interfere with the operation of the windows or the door. As best illustrated in FIGS. 3 and 4, the barrel securing head 35 extends outwardly into the cab as spacer 36 and terminates in a relatively flat vertical surface containing an elongated horizontal elastic cord slot 37. One side of spacer 36 is beveled and the other side protrudes outwardly as a pair of slotted arms 38 which curve backwardly at a 90° angle forming an elastic cord engaging means. As illustrated in FIG. 4, spacer 36 is hollow thereby providing access to the inner surface of elongated slot 37. One end of elastic cord 39 is secured on the inner side of elongated slot 37 by fastening means 40 which may be in the form of a safety pin or the like which will intersect the diameter of cord 39 thereby securing the cord and holder against the inside wall of spacer 36 adjacent elongate slots 37. Obviously other clamping means which would fixedly hold the cord 39 against the inner side of slot 37 such as clamps, knobs, and the like may also be used. To the other end of elastic cord 39 is fastened a knob or handle 41 which is larger in diameter than the elastic cord or the space between fastening arms 38.

As noted in FIGS. 3 and 4 the barrel of the gun 42, when secured in place by means of elastic cord 39, will nestle or rest against the right angle in the spacer face between the elongate slot 37 and the elastic cord engaging arms 38. Preferably the facing of spacer 36 will be covered with felt or a like material to prevent the barrel of the gun from becoming scratched or the blueing rubbed off.

It is evident from the figures that the gun rack as illustrated is most versatile in holding or containing various types of rifles or shotguns designed herein generically as "long guns". Such guns come in a variety of barrel lengths and sizes, for example, some rifles contain magazines which are of approximately the same length as the gun barrel; other guns are double barreled in either a side-by-side or over and under relationship. The present invention renders it possible to secure each of these guns simply and efficiently without need to resort to changing clips, clip positions, and the like. As is evident in FIGS. 3, 4 and 5, elastic cord 39 may traverse the length of elongated slot 37 depending upon the size of barrel resting against the face of spacer 36. The inner end of cord 39 is securely held by fastening means 40 and the elastic cord is then stretched around the gun barrel 42 and firmly anchored in the slot created between arms 38. The positioning of assembly arm 11 may be altered relative to the length of the gun by partially unscrewing bolt 33 so that the fluted interlocking portions of extension arm 30 and adjustment plate 25 are not engaged and by rotating arm 30 to the desired position and then resecuring the extension arm against the adjustment plate by tightening bolt 33.

The length of elastic cord 39 may be adjusted as desired by the point at which fastening means 40 intersects or clamps the end of cord 39. In other words, as the elastic cord stretches and tends to lose resiliency cord 39 may be shortened by resecuring the position or fastener 40 on the cord.

The portions of the gun rack as described herein may be made of any convenient material such as aluminum, steel, or any of a variety of plastic materials which are suitable for this purpose. If desired, the materials may be coated with rubber, leather, felt or other resilient material which therefore allows the rack to securely grip the gun without scratching or wearing off the blueing or damaging of the stock.

Because the rack opens with the door, the gun does not need to be lifted out of a vehicle and there is little danger of its being inadvertently pointed or discharged at anyone either inside or outside of the vehicle. Conversely the gun is pointed upright at all times as it is placed in the rack. With the gun in this position there is little danger that it will be pointed or discharged at anyone either inside or outside the vehicle. While held in this position the gun is conveniently accessible at all times to the sportsman, law enforcement official, or other authorized person who may have need for rapid access to a firearm.

Although a preferred form of the invention has been disclosed it is to be understood that the present disclosure is by way of example and that variations are possible without departing from the subject matter coming within the scope of the following claims, which subject matter is regarded as the invention.

What is claimed is:

1. A two-piece gun rack for a vehicle door for holding mounted rifles, shotguns, and the like in an upright position adjacent said vehicle door comprising:

a gun butt rest adapted to be secured to a lower portion of an inside panel of a vehicle door such that it can be rotated about a substantially horizontal axis and fixedly secured in any rotatable position;

an elongated support arm having at one end thereof attaching means for securing the support arm to an upper portion of the inside panel of the vehicle door such that it can be rotated about a substantially horizontal axis and fixedly secured in any rotatable position and at the other end thereof barrel holding means comprising two legs in a generally right angle configuration, one leg consisting of an elongated extension member having a flat surface face containing an elongated slot, the other leg consisting of a pair of spaced apart, parallel arms, said parallel arms being turned at their outer ends away from the extension member, a curved surface face of said extension member for receiving a gun barrel therein extending between said elongated slot and said parallel arms;

elastic cord means having one end through and slidable along the slot in the said one leg and having an enlarged knob formed at the other end, whereby when said elastic means is positioned to extend between the parallel arms the enlarged knob having a diameter greater than the space between said parallel arms will engage the turned outer ends to hold the elastic means therein; and fastening means slidable along the leg having the slot therein and securing the one end of the elastic means against being pulled through the slot.

* * * * *